United States Patent [19]

Carlin

[11] 4,022,421
[45] May 10, 1977

[54] DELAYED RELEASE VALVE FOR A FIRE HYDRANT

[76] Inventor: Jack M. Carlin, R.F.D. Box 135, Del Mar, Calif. 92014

[22] Filed: Dec. 1, 1975

[21] Appl. No.: 636,556

[52] U.S. Cl. .................................. 251/74; 251/68; 251/303; 251/82; 137/559; 137/527
[51] Int. Cl.² ........................................ F16K 31/44
[58] Field of Search ............... 251/66, 68, 74, 298, 251/303, 71, 30, 82; 137/527, 624.11, 559

[56] References Cited

UNITED STATES PATENTS

| 1,852,999 | 4/1932 | Griffith | 137/559 |
|---|---|---|---|
| 1,912,843 | 6/1933 | Holmes | 251/68 |
| 2,342,589 | 2/1944 | Lewis | 251/68 |
| 2,542,080 | 2/1951 | Herrbold | 251/68 |
| 3,372,899 | 3/1968 | McPherson | 251/30 |
| 3,590,862 | 7/1971 | DeGraaf | 251/83 |
| 3,613,070 | 10/1971 | Jones et al. | 251/30 |
| 3,782,413 | 1/1974 | Chacko | 251/74 |
| 3,799,198 | 12/1972 | Kijimoto | 137/624.11 |

FOREIGN PATENTS OR APPLICATIONS

| 344,990 | 12/1921 | Germany | 251/68 |
| 2,121,389 | 4/1971 | Germany | 251/68 |

Primary Examiner—William R. Cline
Assistant Examiner—H. Jay Spiegel
Attorney, Agent, or Firm—Ralph S. Branscomb

[57] ABSTRACT

The invention is a delayed release valve for a fire hydrant which permits the fireman to couple a fire hose with the valve in place to a fire hydrant, the valve being released subsequent to the coupling operation either by a timer which is set at the time the hose is attached, or by a radio-controlled servo mechanism so that the fireman who makes the hose attachment may proceed to the site of the fire and need not wait at the hydrant until on-site firemen are ready for water.

6 Claims, 5 Drawing Figures

DELAYED RELEASE VALVE FOR A FIRE HYDRANT

BACKGROUND OF THE INVENTION

According to present day fire fighting techniques, when a fire truck first approaches the site of the fire, one of the firemen leaps off the fire truck with the end of a hose fed from a hose bed on the truck and fastens the hose to a fire hydrant near the scene of the fire. The truck then feeds out hose and proceeds to the fire while the man making the hose connection remains by the hydrant until he receives a signal from an on-site fireman to release the pressure, subsequent to which the hydrant man runs to the scene of the fire which may be a block or more away, and arrives relatively exhausted.

Because the nozzle end of the hose must be well manned prior to release of the hydrant pressure to prevent the hose from going out of control, and there is no currently available fire fighting equipment to automatically release pressure to the hose, there is no other way of pressurizing the hose aside from that mentioned, which is clearly undesirable both from the standpoint of the hydrant man arriving at the scene out of breath and the fact that his services at the site of the fire are not available for an initial few minutes.

There is a real need for a delayed release valve connectable to a fire hydrant which will either automatically or by remote control release the hydrant pressure without the presence of a fireman.

SUMMARY OF THE INVENTION

The present invention fulfills the abovementioned needs and comprises a delayed release valve which is normally coupled to the end of a fire hose and is attached to the fire hydrant by a fireman who immediately returns to the fire truck subsequent to attachment of the valve and opening the main control valve of the hydrant. By means of a dual gate structure disposed within a housing for the valve and convering the water inlet from the fire hydrant, the high hydrant pressure is readily contained until opening of the valve is effected in the alternative by either a timing device which is set by the coupling fireman, or by a radio-controlled release operated by a fireman at the site of the fire when the nozzle end of the hose is under control. There is also a bypass channel in the valve housing which communicates directly to the water inlet and which is controlled by a stop-cock so that upon the initial coupling of the valve, the fireman may open the stop-cock, or the stop-cock may already be open, so that by the stream of water spurting from the channel the fireman may ensure that he does not have a "dry hole" before the truck proceeds to the scene of the fire.

DETAILED DESCRIPTION OF THE PREFERRED EMBODIMENT

Figure 1:
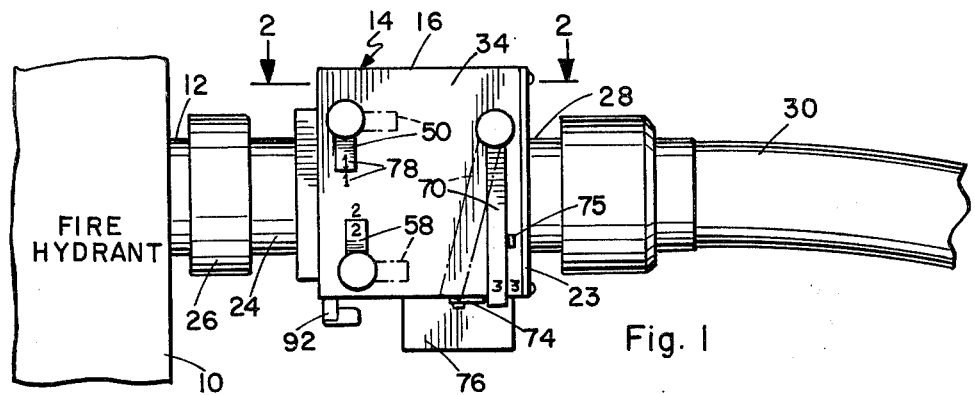
FIG. 1 illustrates the valve unit connected between a hydrant and a hose.
Figure 2:
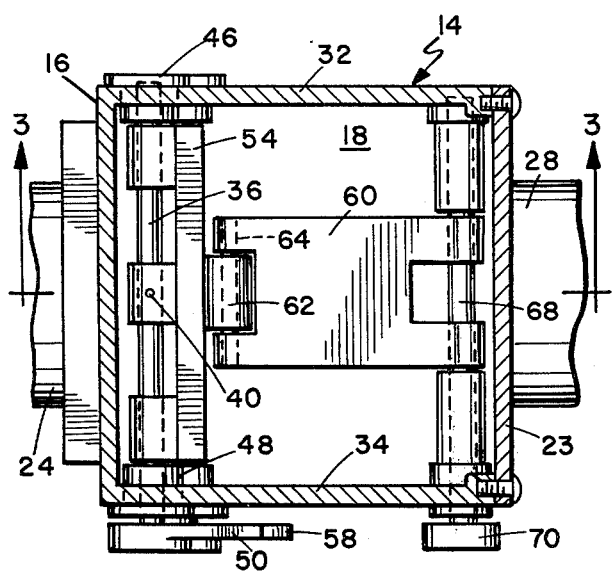
FIG. 2 is an enlarged sectional view taken on line 2—2 of FIG. 1.
Figure 4:
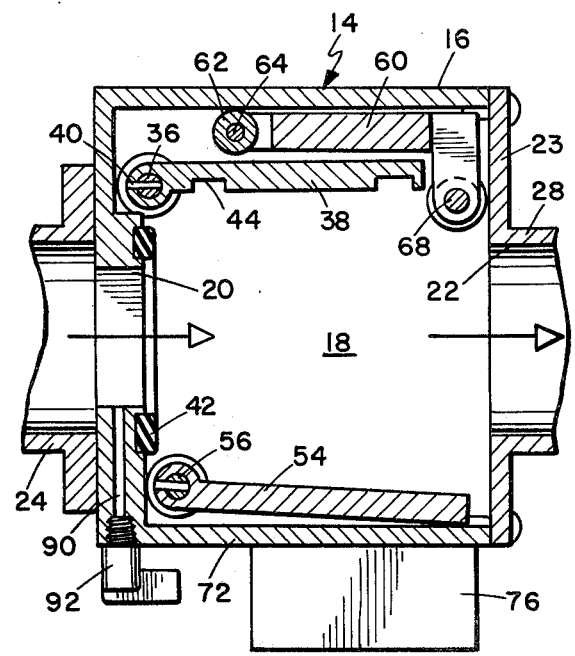
FIG. 4 is a sectional view similar to FIG. 3, but with the valve open.

The valve is shown connected to a fire hydrant, a portion of which is shown at 10 having a hose fitting 12, there being a shut-off valve on the main portion of the hydrant, which is not shown, to permit the removal of a cap from the hose fitting prior to the release of the hydrant pressure. The delayed release valve of the present invention is shown at 14 and has a strong housing 16 defining a water chamber 18 and having an inlet 20, and an outlet 22 defined in a removable end plate 23 as is best seen in FIG. 4. Attached to the housing around the inlet is a stub pipe 24 which is connectable to a fire hydrant by means of a gland 26 as shown in FIG. 1. The housing outlet is similarly provided with a connector 28 which attaches to a fire hose 30 so that the valve unit is interposed at the point where the hose and hydrant are normally joined.

The casing includes a pair of parallel walls 32 and 34 in which a shaft 36 is journalled, this shaft having rigidly mounted thereto a gate-type cap 38 secured against rotation on the shaft by a key 40 or other suitable means. This cap 38 is free to pivot on the shaft from a position illustrated in FIG. 3 in which the cap seals the inlet 20 to the position illustrated in FIG. 4 in which the inlet is opened to permit the passage of water. The seal between the inlet and cap 38 is consummated by a ring 42 which is permanently embedded in the housing surrounding the inlet and mates with a channel 44 cut in the cap. The shaft 36 is sealed in journalled relationship in the side wall 32 by means of an insert bushing 46, and on the other end, the shaft projects through bushing 48 terminating in a reset lever 50, there being an O-ring 52 provided for sealing purposes.

Figure 5:
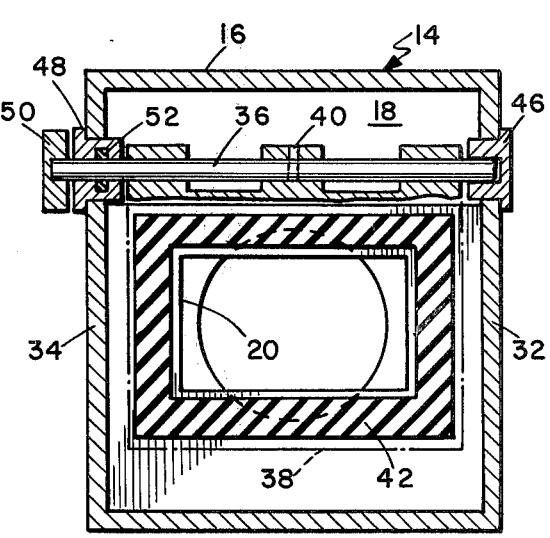
FIG. 5 is a sectional view taken on line 5—5 of FIG. 3.

The sealing structure which incorporates the ring seal 42 and channel 44 is exemplary only, it being possible to provide the O ring 52 as circular rather than square as illustrated in FIG. 5, or an entirely different sealing structure could be used such as a resilient truncated cone attached to the mating surface of the gate 38 which seats in an interiorly bevelled inlet 20.

Figure 3:
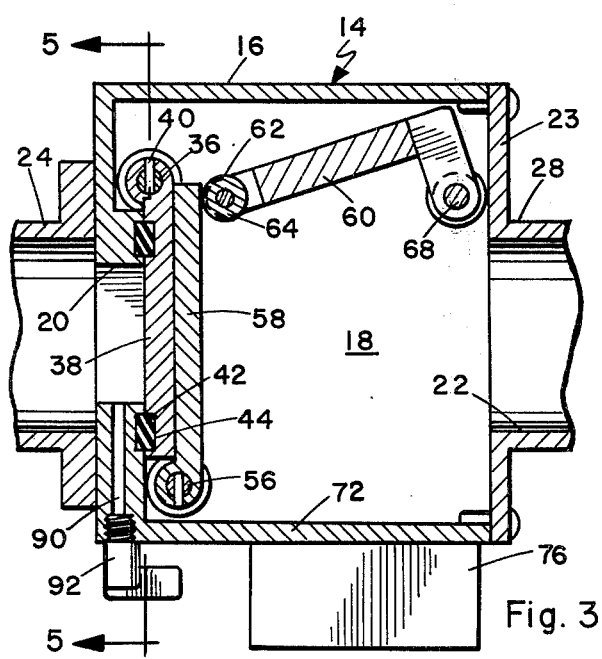
FIG. 3 is a sectional view taken on line 3—3 of FIG. 2.

A second flap or gate 54 is attached to a shaft 56 in similar fashion to the first gate and shaft, and this shaft also extending through the side wall 34 terminating in a reset lever 58. It will be noted that the two gates 54 and 38 are hinged on mutually opposite sides of the inlet and when in their closed position, as illustrated in FIG. 3, are flush against one another so that a leverage factor is involved, the high pressure existing at the inlet and felt by the first gate being severely reduced as the pressure is applied to the second gate at a point adjacent the hinge thereof.

The second gate is held in place when the valve is shut by means of an L-shaped arm 60 which is provided with a roller 62 at the gate-contacting end thereof, the roller being retained by a pin 64. The other end of the arm is rigidly attached to a shaft 68 journalled in said housing on the generally opposite side thereof from the inlet, and as can be seen in FIG. 4, this arm is so shaped that it sits more or less snuggly in a corner of the housing when the valve is opened, permitting both the gates to swing open completely clear of the stream of water flowing through the housing.

One end of the shaft 68 projects through the housing and terminates in a lever 70. It will be noted that on one of the side walls 72 of the housing which joins the two side walls 32 and 34, there is a trigger or dog element 74 which will prevent the lever 70 from moving, thus retaining the arm 60 against the second gate so that the valve remains closed. It should also be noted that the point of contact of the roller 62 against the second gate is slightly upward from the pivot point of the arm, as viewed in FIG. 3, so that the arm will be biased into the opening position by water pressure transmitted through gate 54, and the lever 70 will be biased against the pivoted trigger 74. It can thus be seen that by releasing the trigger as by pivoting it downward and away from the lever 70, the arm 60 will roll on the second gate and clear thereof, permitting the second and thus the first gates to fly open as illustrated in FIG. 4.

When resetting the valve after use, a procedure which will be described below, some means is needed to prevent the arm 60 from riding over the center so that it will be biased in the wrong direction. A raised limit-defining shoulder could be provided directly on the gate 54 or, as illustrated in the preferred embodiment, a shallow stud 75 could be manufactured on the casing to limit the travel of the reset lever 70.

As indicated at 76, a small control box is mounted to the housing to operate the trigger 74. The control is obviously diagrammatically presented and represents in the alternative a timer and a radio-controlled servo-mechanism. In the case a timer is used, during the actual use of the device, the fireman in charge of hose connection disembarks from the fire truck at the site of the fire hydrant, connects the hose with the delay valve already mounted thereto to the fire hydrant, turns on the main hydrant valve, sets the timer on the delay valve, returns to the truck and the truck proceeds to the site of the fire. After the predetermined time for which the timer is set expires, the hydrant pressure is released through the hose. Because all fire trucks contain a water reservoir, the fire fighting can begin immediately upon arrival at the fire site by tapping this reservoir which will provide adequate water until the timer releases the hydrant pressure. Of course if the control 76 comprises a radio-controlled device, a fireman on the truck may activate it at the site so that at the exact instant water is required it will be provided. In order that a signal from different trucks do not activate the valve used by other trucks, it is contemplated that each valve be operated by a single tone, and that each tone be different, at least in the same area.

After the release valve has been used, it must be reset. This is accomplished by manually twisting the reset levers 50, 58, and 70 from the positions illustrated in phantom in FIG. 1, representing the free flowing mode of operation, to the positions illustrated in solid line. This will of course swing the gates and the swing arm 60 into the closed position, and to clarify the exact positioning of the levers in the closed position, some indicia or the like is needed on the housing. In the illustrated embodiment, numbers are printed on the levers and corresponding numbers are printed on the housing adjacent the position in which the levers will be when the valve is in closed position, as indicated at 78.

Another problem which the present invention solves is that of the "dry hole". This problem results from the fact that not all fire hydrants are operative and provide water, a fact situation which would not ordinarily become evident to the firemen until the hose has been coupled to the hydrant and the hydrant pressure released after the fire truck is a block or two away at the fire site. The obvious result of such an incident is the serious delay in the effort to control the fire, and to eliminate this, there is provided in the present invention a channel 90 which communicates directly from the inlet through the exterior wall structure of the housing and is controlled by a stop-cock valve 92 which, for maximum time efficiency, would be open when the fireman attaches the structure to the structure to the fire hydrant. Thus, immediately after connecting the release valve to the hydrant, the fireman opens the main vlave on the hydrant to release pressure to the inlet which will spurt through the channel if the hydrant is wet. The fireman then closes the stop-cock valve and sets the timer if a timing device is used and proceeds with the other fireman to the scene of the fire, confident that a "dry hole" has not been relied upon.

It is believed that the delayed release valve disclosed herein, although basically simple in concept, will alter and improve traditional methods of fire fighting and contribute to the saving of buildings that otherwise would have been destroyed and even possibly save lives.

I claim:
1. A delayed-release valve for a fire hydrant comprising:
   a. a housing defining a self-contained water chamber with an inlet and an outlet;
   b. means to connect said inlet to a fire hydrant and said outlet to a fire hose;
   c. a movable gate pivotally mounted in said housing at one side of said inlet and movable by water pressure existing at said inlet from a first position sealed against said inlet to a second position clear of said inlet;
   d. a second gate hinged to said housing on the side of said inlet opposite the side to which the first-mentioned gate is hinged, said second gate being pivotal between a position free of said first-mentioned gate to a position parallel to and flush against same to hold same in sealed position such that the free end of said first gate is restrained by said second gate primarily near the pivoted end of said second gate whereby said gates together define a leverage multiplier for restraining water pressure;
   e. means releasably engaging said second gate by the free end of said second gate to hold said second gate in said first position;
   f. a control device mounted on said housing to effect releasing of said engaging means to permit the gates to move clear of said inlet.

2. Structure according to claim 1 wherein said engaging means comprises an arm pivoted at one end to a portion of said housing generally opposite said gates and having a bearing mounted on the free end thereof, said arm being pivotal from a position in which said bearing rests against said second gate to block the opening thereof to a position clear of said second gate.

3. Structure according to claim 2 wherein the contact point between said roller and said second gate when same is closed is misaligned relative to the pivotal axis of said arm such that water pressure transmitted through said second gate to said bearing biases said arm into the position clear of said second gate.

4. Structure according to claim 2 wherein said gates and said arm each include a rigidly mounted shaft journalled in said housing and each shaft has one end thereof projecting through said housing with a reset lever mounted thereon.

5. Structure according to claim 4 and including a trigger mounted to said housing pivotal from a position blocking the reset lever of the shaft to which said arm is mounted in the valve-closed position to a position free therefrom, and said control device is operatively connected to said trigger.

6. Structure according to claim 1 and including a bleed channel comprising a bore in said housing communicating directly through said housing to said inlet upstream of said gates when said valve is mounted to a hydrant and further including a valve mounted on said housing and controlling flow through said channel, whereby the existence of water at said inlet can be determined prior to releasing said gates by opening said flow-controlling valve.

* * * * *